FIBER OPTIC SCANNING APPARATUS

Original Filed Feb. 7, 1963

5 Sheets-Sheet 1

INVENTORS
Jerome S. Goldhammer
William L. Mohan Jr.
Harry A. Wayne
BY Jacques L. Meister
AGENT INVENTORS
Jerome S. Goldhammer
William L. Mohan, Jr.
Harry A. Wayne
BY Jacque L. Meister
AGENT

FIBER OPTIC SCANNING APPARATUS

Original Filed Feb. 7, 1963 5 Sheets-Sheet 3

INVENTORS
Jerome S. Goldhammer
William L. Mohan, Jr.
Harry A. Wayne
BY Jacques L. Meister
AGENT Sept. 10, 1968 J. S. GOLDHAMMER ET AL 3,401,232

FIBER OPTIC SCANNING APPARATUS

Original Filed Feb. 7, 1963 5 Sheets-Sheet 4

INVENTORS
Jerome S. Goldhammer
William L. Mohan, Jr.
Harry A. Wayne
BY Jacques L. Meister
AGENT

FIBER OPTIC SCANNING APPARATUS

Original Filed Feb. 7, 1963 5 Sheets-Sheet 5

INVENTORS
Jerome S. Goldhammer
William L. Mohan, Jr.
Harry A. Wayne
BY Jacques L. Meister
AGENT United States Patent Office 3,401,232
Patented Sept. 10, 1968

3,401,232
FIBER OPTIC SCANNING APPARATUS

Jerome S. Goldhammer, Barrington, William L. Mohan, Jr., Prospect Heights, and Harry A. Wayne, Skokie, Ill., assignors to Chicago Aerial Industries, Inc., Barrington Village, Ill., a corporation of Delaware
Original application Feb. 7, 1963, Ser. No. 256,866, now Patent No. 3,325,594, dated June 13, 1967. Divided and this application Apr. 17, 1967, Ser. No. 658,967
12 Claims. (Cl. 178—7.1)

This is a division of application Ser. No. 256,866, now U. S. Patent No. 3,325,594, filed on Feb. 7, 1963, by the same inventors and assigned to the same assignee.

This invention relates generally to flying spot scanners as used in both the recording and reproduction of radiation data and more particularly the invention relates to a fiber optic flying spot scanner system.

Flying spot scanners presently in use can be roughly divided into four general types. One type is characterized by the use of TV camera tubes. A second type of flying spot scanner is characterized by the use of a more or less conventional type of cathode ray tube. In this second type of flying spot scanner, the spot is caused to scan across the tube utilizing conventional sweep techniques and, where the system is a reproduction system intensity modulation of the spot is utilized.

A third, and probably the oldest of the flying spot scanner systems, are the mechanical-electrical systems of the type used in the early days of television. The fourth and most recent type of flying spot scanner is characterized by the use of a fiber optics shape transducer, most frequently of the circle-to-line type.

Generally, all four types of flying spot scanners described above suffer from relatively serious deficiencies. The scanners employing TV camera tubes involve storage or retention of an image scene and in general do not permit complete readout in scanning. Also, because of the persistence of previous picture information, this type of flying spot scanner system tends to degrade resolution. Additionally, TV camera tubes are quite fragile and require both delicate and exacting electronic circuitry.

Flying spot scanner systems utilizing conventional cathode ray tubes are similar to systems using TV camera tubes in that they are fragile and require critical electronic circuitry. Another and more serious drawback to the use of conventional cathode ray tubes is the low maximum level of light flux that can be attained when spot diameters are made small to attain high system resolutions.

Flying spot scanners of the mechanical type employ rotating optical systems which have a tendency to be quite heavy. Generally, because of the size and weight of their components, such systems are quite profligate of power without achieving either an increased intensity of the scanning spot or better resolution. These deficiencies of this type of system are due not only to the basic principles employed, but are also due to a technological inability to manufacture precision slots narrow enough.

The fourth type of flying spot scanner described above, the type characterized by the use of fiber optic shape transducers, is the newest type of flying spot scanner system and was evolved in an attempt to simplify and make lighter and more reliable flying spot scanners than could be made utilizing the principles of the first three types described above. While the majority of objects relating to the reliability and simplicity of fiber optic flying spot scanners have been achieved, there remains a relatively large number of problem areas which have mitigated the use of this type of scanner. Some of these problem areas include high power consumption, inability to utilize opaque copy as an input and difficulties encountered in synchronizing the scanner and associated equipment.

Accordingly, it is a general object of this invention to provide an improved fiber optic flying spot scanner.

It is another object of this invention to provide an improved fiber optic flying spot scanner less wasteful of power than scanners of the prior art.

It is still another object of this invention to provide an improved fiber optic flying spot scanner capable of transmitting radiation from a source to a record medium at higher intensities than heretofore possible, or from a record medium to a sensor at higher intensities than heretofore possible.

It is a further object of the invention to provide an improved fiber optic flying spot scanner capable of use with either transparent or opaque copy.

Yet another object of the invention is to provide an improved fiber optic flying spot scanner capable of higher frequency response or faster scanning rates than heretofore possible.

It is a still further object of this invention to provide an improved fiber optic flying spot scanner using optical methods of initiating synchronizing pulses for use with auxiliary equipment.

An important object of the invention is to provide an improved fiber optic flying spot scanner, radiation distribution means more efficient than heretofore in use.

It is another object of this invention to provide an improved fiber optic flying spot scanner which may advantageously be combined with apparatus for processing or developing the copy input to the scanner before scanning.

These and other objects are realized in accordance with the features of a specific illustrative embodiment of the invention, which comprises a radiation distributor for directing radiation to a fiber optic circle-to-line shape transducer from a radiation source or to radiation sensor means from a fiber optic circle-to-line shape transducer. The above and other features of novelty which characterize the invention are pointed out with particularity in the claims annexed to and forming a part of this specification. For a better understanding of this invention, however, its advantages and specific objects attained by its use, reference is made to the accompanying embodiments of the invention.

Figures 9, 9A:
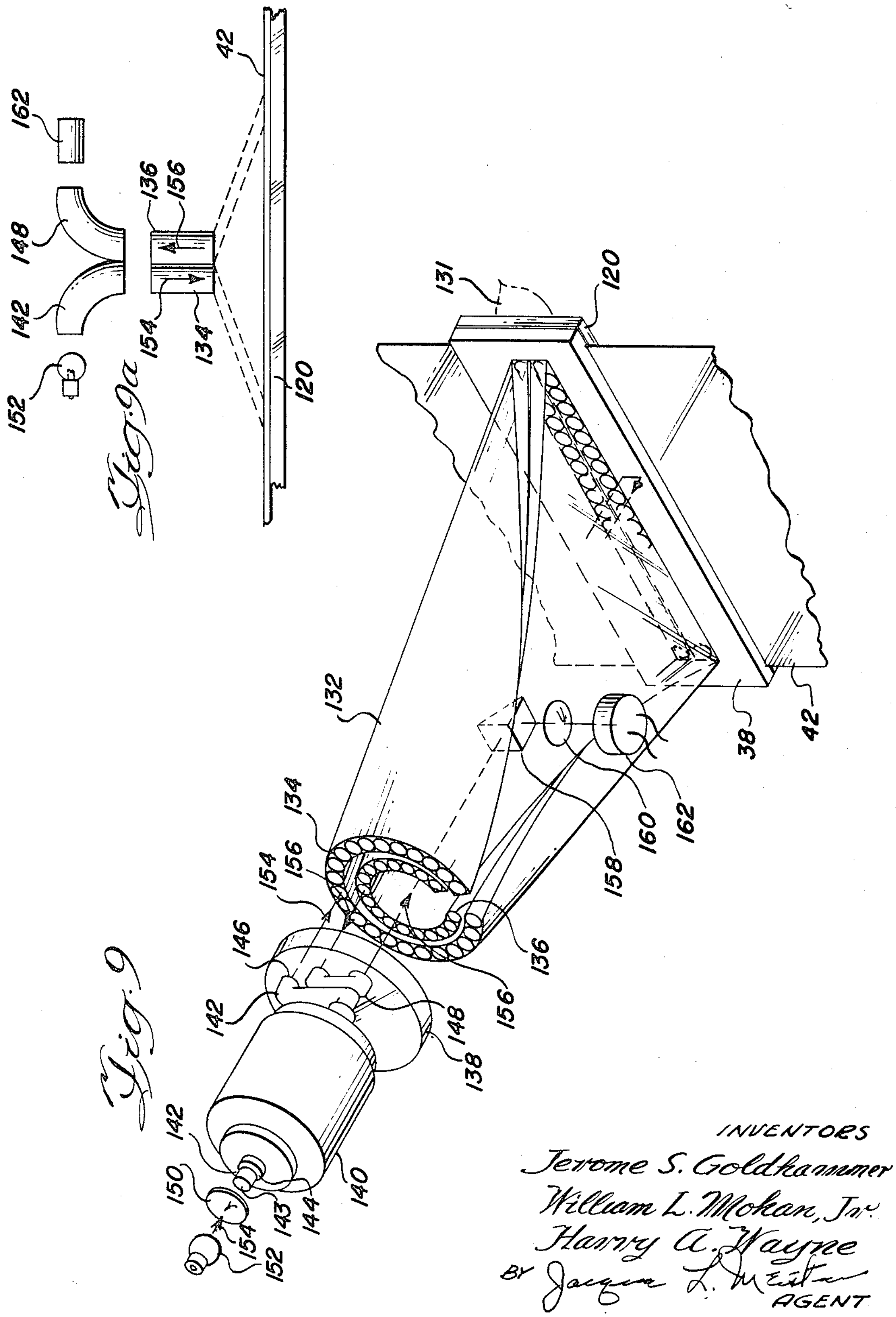
FIGURE 9 illustrates another configuration useful for reflex scanning.
Figures 10, 11, 12:
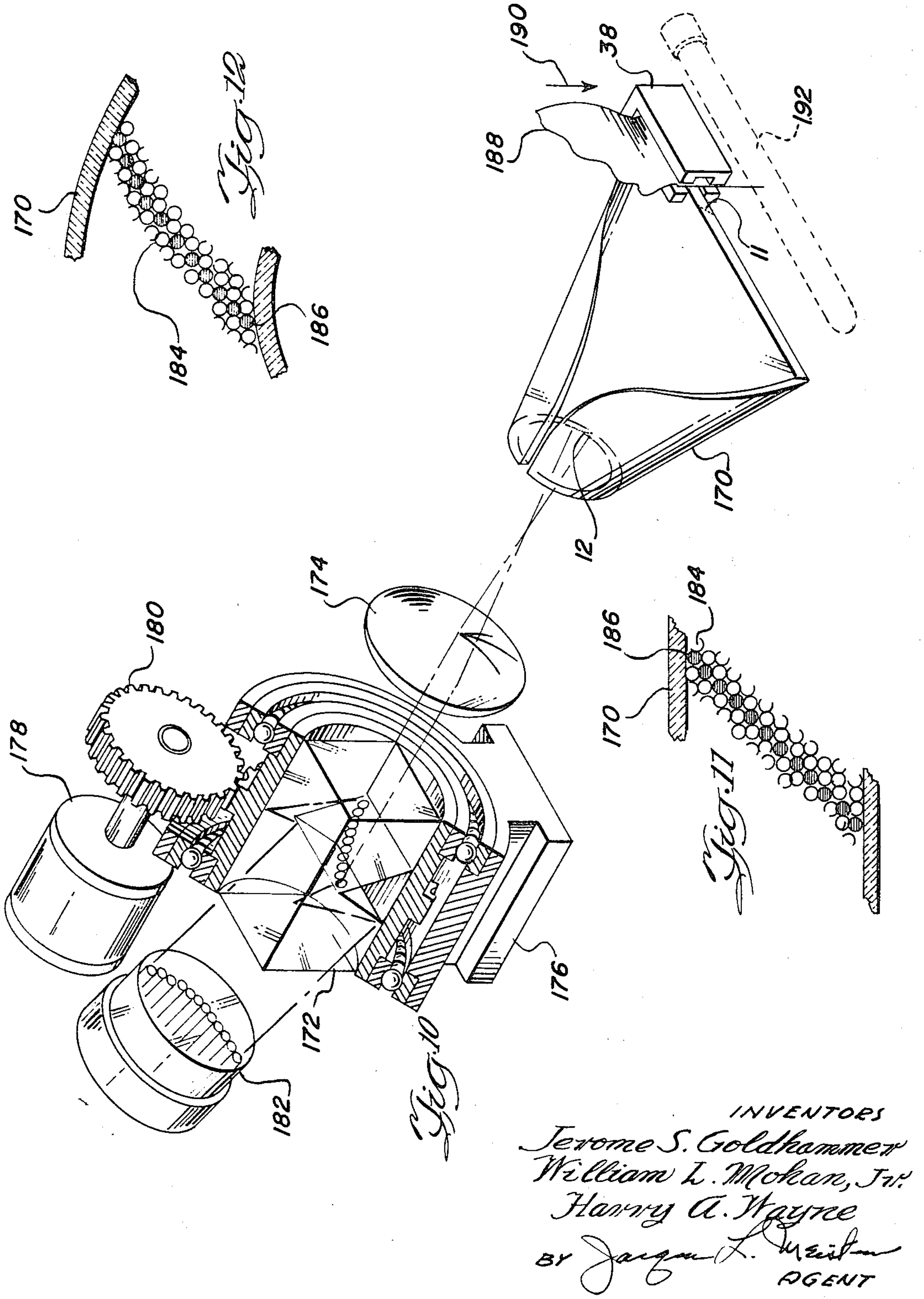

FIGURE 9–A is a detailed schematic enlargement of the apparatus of FIGURE 9;

FIGURE 10 is a schematic in perspective of a printer embodiment of the invention employing a simultaneous multiple line scan;

FIGURE 11 is a fragmentary end view of the straight line end of the fiber optic circle-to-line shape transducer taken at 11 in FIGURE 10 illustrating a radiation pattern incident thereon; and FIGURE 12 is a fragmentary end view of the circle end of the circle-to-line shape transducer taken at 12 in FIGURE 10 and illustrating a radiation pattern incident thereon.

Operation of the invention advantageously may be described with reference to FIGURE 1 of the drawing wherein a fiber optic circle-to-line shape transducer is illustrated at 20. As will be apparent to those versed in the fiber optic arts such shape transducers are made from a plurality of discrete radiation conducting fibers optically insulated from one another and arranged in a circle at their one end and fanned out to form a line at their other end. The particular material used in each of the individual optical fibers is dependent in some measure upon the radiation to be conducted through the fiber. Further details as to the construction of such shape transducers can be had by reference to the copending application of Gallagher et al., Ser. No. 242,016, filed Dec. 3, 1962 and assigned to the same assignee as this application.

Positioned at the circle end of the shape transducer is a rotatable circular scanning disc 21. Scanning disc 21 is secured to the output shaft of drive motor 22 for rotation about an axis that is coincident with the axis of the circular end of shape transducer 20. Embedded in scanning disc 21 or otherwise suitably secured thereto, is a radiation distributor 23. Radiation distributor 23 advantageously may take the form disclosed in the copending application of Joseph Singer, Jr., Ser. No. 216,646, filed Aug. 12, 1962 and assigned to the same assignee as this application. Radiation distributors constructed in accord with that application comprise one or more radiation transmitting optical fibers for radiation surrounded by non-transmitting filler and support material.

Figures 1, 2, 3:
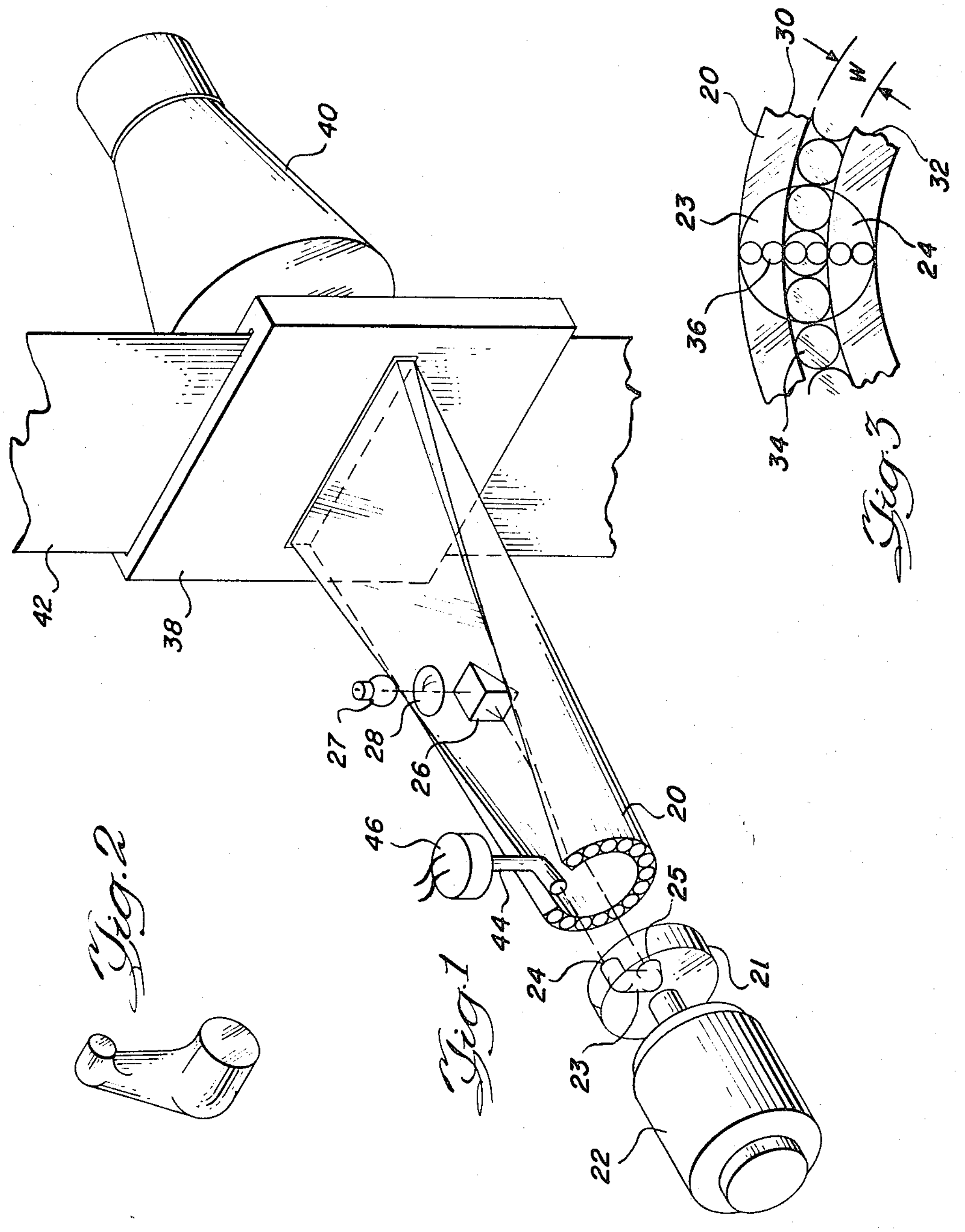
FIGURE 1 is a simplified perspective illustration of the principal optical and mechanical elements of the invention employed in the simplest of the inventive embodiments.
FIGURE 2 is a perspective view of a radiation distributor utilizing an alternative configuration to that illustrated in FIGURE 1.
FIGURE 3 is a fragmentary end view of the circle end of a circle-to-line shape transducer.

Another configuration of radiation distributor that may advantageously be employed, is illustrated in FIGURE 2. As there illustrated, the radiation distributor has the same general outline illustrated in FIGURE 1. However, in addition, the distributor of FIGURE 2 is constructed from a tapered fiber bundle. In some applications this has proven to be a highly efficient means of concentrating the light flux incident on the fibers of the shape transducer 20.

One end 24 of radiation distributor 23 is centrosymmetrically aligned with the optical fibers comprising the circular end of shape transducer 20 and in close proximity thereto. The other end 25 of radiation distributor 23 is aligned with the axis of rotation of scanning disc 21 and faces towards the interior of shape transducer 20.

A prism 26 located interior of shape transducer 20 reflects the image of a radiation source 27 as imaged by lens 28 upon the axial end 25 of radiation distributor 23. In this manner as motor 22 turns scanning disc 21 and radiation distributor 23, the image of source 27 is passed by the radiation distributor 23 in sequence to the ends of the radiation transmitting fibers at the circular end of shape transducer 20. This arrangement where substantially all of the light from a relatively small source is imaged upon the radiation distributor 23 results in substantial power savings. How the inventive apparatus achieves its power saving advantage over other fiber optic flying spot scanners becomes apparent when their physical arrangement is consideed and compared to the instant invention.

In other fiber optic flying spot scanners, the radiation source is placed at the line end of the shape transducer and the photo-cell at the circle end. Naturally, in such a configuration to achieve equivalent illumination at the photo-cell, the source must simultaneously irradiate each of the fibers at the line end of the scanner with an intensity of radiation equivalent to that imaged on a single fiber by the radiation distributor of the invention. Thus, other fiber optic flying spot scanners are forced to use substantially more power than that necessary in the inventive arrangement.

Another advantage of the inventive arrangement of radiation distributor and light source is the considerably reduced volume it occupies because of its folded optical path. Reduced volume is especially advantageous in airborne operations such as encountered in military reconnaissance.

Another and most important advantage of the invention is the resolution enhancement, achieved by the use of a radiation distributor comprised of fiber optic elements rather than the conventional refractive optics used in other fiber optic flying spot scanners. How this enhancement of resolution is achieved is best illustrated in FIGURE 3 of the drawing.

FIGURE 3 shows a fragmentary view of the circular end of shape transducer 20. As there illustrated, there is assembled between supporting structures 30 and 32 a plurality of radiation conducting fibers 34. The fibers 34 are of substantially uniform diameter and have ranged in size between 0.0005 and 0.005 inch in diameter. In the majority of embodiments thus far constructed, these fibers have been 0.001 inch in diameter. Shown superimposed over the fragmentary section of the shape transducer is the end 24 of radiation distributor 23. Following the construction principles and methods of the aforementioned Singer invention, the radiation distributor 23 is comprised of a plurality of very small conducting fibers 36 supported by a radiation non-conducting structure. As shown in FIGURE 3, the fibers 36 are positioned in a line which ideally is positioned coincident with a radius extending outwardly from the axis of rotation of the radiation distributor 23. With the plurality of fibers 36 thus arranged in a row and if the fibers 36 have their diameter limited to no more than one-half the diameter of the radiation conducting fibers 34, an important enhancement in image resolution occurs. This enhancement appears to be due to a reduction in the cross-talk occurring between the various individual fibers 34 of shape transducer 20.

Positioned adjacent the line end of shape transducer 20 is a guide 38 for record medium 42. In embodiments constructed to date, film guide 38 has been manufactured from various plastic materials, from metal, and from metal coated with plastic. Currently, the preferred construction for film guide 38 employs plastic coated metal. In such a construction the plastic coating advantageously is one of the poly-fluorides such as those commercially known as "Teflon" or "Kel-F."

A radiation detector 40 is positioned adjacent film guide 38 in such a manner as to receive the radiation emitted by the individual fiber optic elements 34 of the shape transducer 20 after the radiation passes through record medium 42. Record medium 42 for the majority of end uses has most frequently been negative photographic film, although obviously, and as brought out further in the description that follows, other record mediums may equally well be employed. Presently preferred as radiation detectors are photo-multipliers because of their high sensitivity and because they are available in sufficient size to span the width of the line end of the shape transducer 20. While considerable experimental work has been completed on embodiments employing fresnel lenses to focus radiation on a smaller size and/or other types of radiation detectors, because of light losses in the optics or lowered sensitivity or increased volume requirements, etc., the above described construction employing a photomultiplier has thus far proven to be most advantageous.

In operation with radiation source 27 activated and with drive motor 22 rotating radiation distributor 23, a uniform intensity spot of light or other radiation is caused to cyclically scan or sweep across the linear end of shape transducer 20. Simultaneous with the cyclical scan of the spot of light, the record medium 42 is moved at a constant velocity past the linear end of shape transducer 20. The velocity at which the record medium is moved past the shape transducer is directly related to the width $w$ of the conducting fibers 34 of the shape transducers and is inversely proportioned to the time required for a single rotation of radiation distributor 23. The pattern laid down by the cyclically scanning spot of light upon the moving record medium 42 for zero overlap between the repeated scans is illustrated in FIGURE 4.

Figure 4:
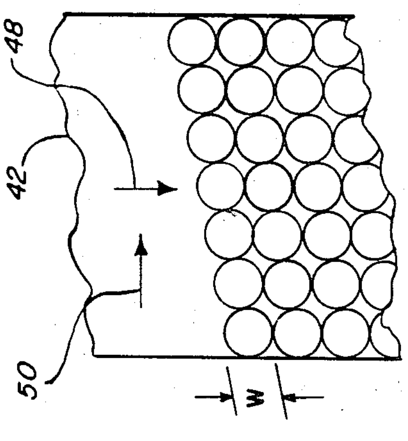
FIGURE 4 illustrates the scanning pattern achieved with the embodiment of FIGURE 1.

In FIGURE 4, record medium 42 is illustrated moving in the direction of arrow 48 relative to a scanning spot moving in the direction of arrow 50. The most frequently used rate of movement of record medium 42 and one that is presently preferred because of the ready availability of accurate frequency standards for controlling the sweep rate, is 0.4 inch per second. This rate is achieved for zero overlap of the scanning spot between successive sweeps when the spot diameter $w$ is 0.001 inch and the total time for a complete sweep is 0.0025 second (400 cycle reference).

Another feature of the invention is achieved when the inventive principles are employed in an alternate configuration to that of FIGURE 1. This alternate configuration employs the principles of a strip camera in combination with the principles of this invention to provide a video output representative of a source scene moving relative to the apparatus. This video output is comparable to that achieved with side looking radar but with considerably less weight and circuit complexity. The strip camera-like alternate configuration, being a modification of FIGURE 1, is not separately illustrated and is described in terms of its differences from that figure.

In the strip camera-like alternate configuration, the inventive apparatus is positioned at a distance H from the source scene it is desired to record and the apparatus or scene moved at a rate V relative to each other. A lens of focal length F takes the place of detector 40, guide 38 and film 42 to direct the image of the source scene upon the line end of shape transducer 20. Radiation source 27 is replaced with any suitable radiation detector. With the long dimensions of the line end of the shape transducer 20 positioned at a right angle relative to the velocity vector existing between the scene and the apparatus, the advantageous results are achieved by having motor 22 effect a cyclical scan of the line end of the shape transducer.

For zero overlap in the video output and with zero retrace time, the speed of scan motor 22 in revolutions per second is controlled to be:

$$RPS=VF/Hw$$

where $w$ is the width of the line end of the shape transducer 20 as illustrated in FIGURE 3. The effect if this video output were to be recorded on photographic film is analogous to that illustrated in FIGURE 4. However, as will be apparent, this alternate configuration permits a considerable weight saving in the transporting vehicle over systems in which the scene is first photographed and then scanned and transmitted.

Figure 5:
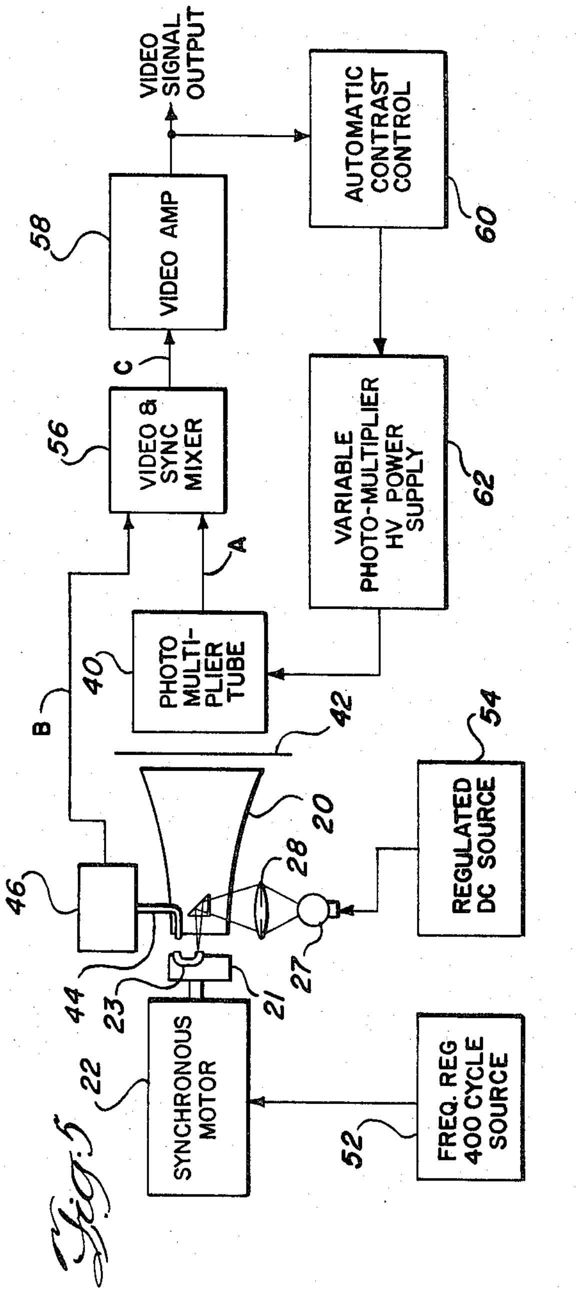
FIGURE 5 is a schematic block diagram representative of a preferred circuit arrangement used in conjunction with the apparatus of FIGURE 1.

FIGURE 5 is a schematic block diagram representative of a preferred circuit arrangement used in conjunction with the apparatus of FIGURE 1 and employs the same reference numerals for like elements. As will be obvious after considering the circuit arrangement of FIGURE 5, it is amenable with minor modification to all inventive embodiments having a single video output. As indicated in FIGURE 5, it has been found advantageous to utilize a synchronous drive motor 22 to drive the scanning disc 21. By utilizing a synchronous drive motor in combination with a power source of closely regulated frequency, it has been possible to reduce false modulation of the scanning signal spot such as is caused by variations in the rate of scanning speed. Synchronous motors operated at loads which do not cause them to fall out of step are less subject to speed variations than other types of electric motors and this ability is generally enhanced by the use of increasingly higher frequencies. However, limiting source frequency to 400 cycles per second has proven to be an adequate design compromise.

Variations in the intensity of radiation source 27 present another possible source of false output signals. It has been found, however, that this source of false signals can be reduced to an undetectable level by using a regulated DC supply 54 in combination with an incandescent radiation source having a low frequency response to variations in source voltage or current.

Figure 6:
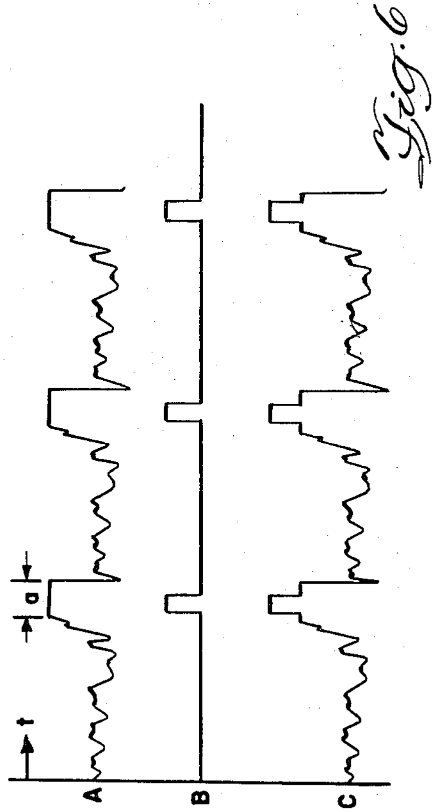
FIGURE 6 is a corresponding graphical representation of the voltage wave shapes occurring within the block diagram circuitry of FIGURE 5.

As shown in FIGURE 6, the output of photo-multiplier tube 40 resulting from the impingement thereon of the scanning radiation passed through record medium 42, is a video signal superimposed on a DC level representative of the average scene brightness recorded on the record medium. This video output signal is shown as wavetrain A in FIGURE 6. Note that in wavetrain A the video signal oscillates about the DC level, and, during the interval $a$ occurring between scanning sweeps and corresponding to retrace in conventional video practice, the output of the photo-multiplier tube assumes its black level. The retrace times $a$ shown in FIGURE 6A have been exaggerated to facilitate illustration. However, even though the retrace intervals $a$ can be made quite small, it has not proven possible to make the wave front at either the beginning or the end of this interval steep enough to dependably generate a video horizontal sync pulse. It is a special feature of this invention that this video horizontal sync pulse can advantageously be generated by irradiating a photocell 46. Photocell 46 is irradiated by radiation passed through a fiber optic light pipe 44 inserted into shape transducer 20 in a position to be illuminated by radiation distributor 23 during retrace intervals $a$. The output wave train B of photocell 46 is shown at B in FIGURE 6. Both wavetrains A and B from photo-multiplier tube 40 and photocell 46 respectively, are fed to a video sync mixer 56 where they are combined to form the composite video signal C illustrated at C in FIGURE 6. The composite video signal C is amplified in the circuit illustrated as block 58 and passed as an output signal to transmission equipment not forming a part of this invention.

Since, as indicated above, the average DC level of the video signal is representative of the average scene brightness recorded on record medium 42, it has proven advantageous to monitor the output of video amplifier 58 with an automatic contrast control 60. Automatic contrast control 60 continuously samples the amplified video output to determine its average DC level and, by means of circuitry that is conventional and well known to those versed in the electrical arts, provides an output control signal proportional to that level. This output control signal of the automatic contrast control 60 is used to control a variable photomultiplier high voltage power supply 62. This high voltage power supply 62 is used to bias the accelerating dynodes of photomultiplier tube 40 to maintain average scene brightness at some predetermined and desired level.

Provisions for image enhancement are not shown in the block diagram circuitry of FIGURE 5 since any requirements for this feature have proven to be highly dependent upon the characteristics of the record medium 42. However, in many embodiments it has proven advantageous to use high frequency peaking which results in differentiation of the video waveform. This high frequency peaking produces an image enhancement by outlining the contrast gradients of the record medium in a manner well known to those versed in the video arts.

Figures 7, 8:
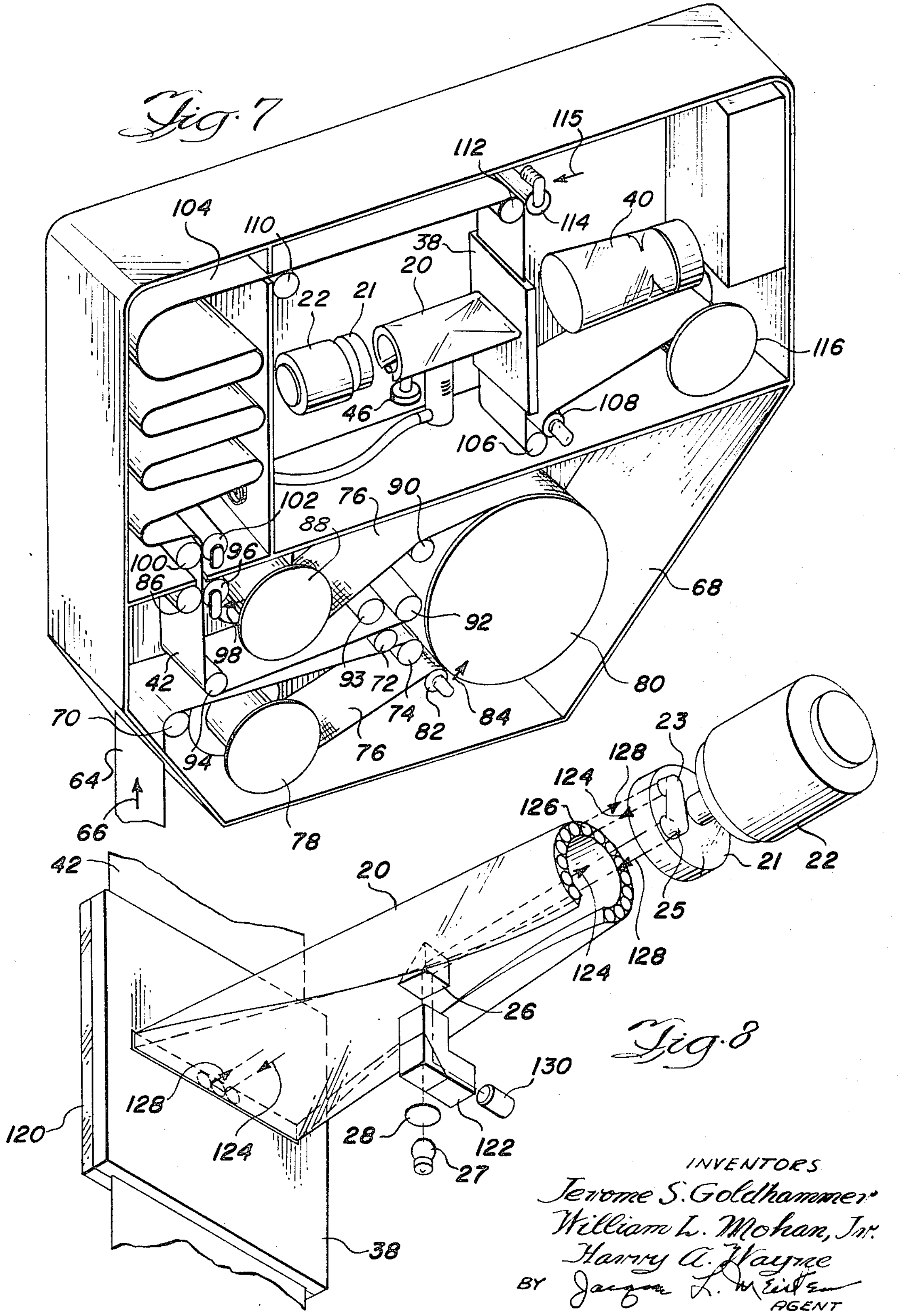
FIGURE 7 illustrates in perspective one embodiment of the inventive apparatus combined with film processing apparatus.
FIGURE 8 illustrates in perspective a configuration of the invention useful in reflex scanning.

FIGURE 7 illustrates in perspective a currently preferred embodiment of the inventive fiber optic flying spot scanner apparatus. Because this scanner apparatus is exceptionally well adapted to the continuous scanning of photographic film, the invention contemplates its combination with rapid processing apparatus adapted to continuous or intermittent rapid processing of exposed film. One process exceptionally well adapted to such requirements utilizes the saturated web technique. In the saturated web technique of rapid processing, one or more carrier webs or strips of material coated or saturated with the various processing chemicals are brought into contact with the exposed film to deposit chemicals thereon. Generally the chemicals used are monobaths because of the increased mechanical simplicity possible in the processor with fewer webs.

In utilizing the web technique of photographic film processing, exposed film from the camera is processed by sandwiching it with a web material that has been impregnated with a monobath developing solution. When sandwiched with the film, the monobath impregnated web gives up the required amount of solution to fully develop the film to produce a negative suitable for scanning.

Although no photographic camera is shown in FIGURE 7, it is contemplated that the processing-scanning apparatus of FIGURE 7 will be used with cameras having either continuous or intermittent outputs of film. As a result it has been found advantageous to drive the rapid processing apparatus of FIGURE 7 by the drive mechanism normally employed to take up exposed film in the camera. Thus when subsequent to an exposure the camera's film takeup mechanism feed is actuated to feed film, the rapid processor is also actuated and applies web material to the exposed film to develop it. Although camera actuated mechanisms are presently preferred, self powered mechanisms have, on occasion, been employed to advantage.

During the operation of the apparatus of FIGURE 7, exposed film 64 moving in the direction of arrow 66 enters the film processing cassette 68. The film is threaded past idler rollers 70, 72 and 74 to engage developing drum 80 around which it is wrapped. A monobath saturated web 76 is stored on supply spool 78 and is threaded over pressure roller 82. Pressure roller 82 is spring biased in the direction of arrow 84 to cause the saturated webbing material to be pressed agianst the exposed film 64 on developing drum 80. Because the film 64 is wound on drum 80 emulsion side out, the saturated web adheres to the film due to the adhesive forces of the wet film emulsion and also due to the capillary action of the processing material between the emulsion and the web material.

In developing photographic film as in many other types of chemical reactions, reaction rate and quality of the finished product are temperature dependent. Thus, where it is an objective to obtain consistent, high quality results in film processing, it is necessary to provide a temperature controlled environment. In the processing attachment of the invention, this controlled temperature environment is achieved by the use of thermostatically controlled heaters assembled within the rotating developing drum 80. Since the construction of the heaters and their thermostatic controls is well known to those versed in the electrical arts and since their construction forms no part of the invention they are not described further herein.

The developing drum 80 and a drive roller 86 are both positively driven in the inventive embodiment by the camera's takeup drive mechanism. Obviously, however a simple extension of the driven mechanism principle disclosed in the application of Elliott et al., Ser. No. 99,495 filed Mar. 30, 1961 and assigned to the same assignee could be used to render the film processing cassette 68 of this application completely independent of the drive mechanism of the camera with which it is associated.

As the film and saturated web are advanced through the film processing cassette 68 under the driving impetus of drum 80 and drive roller 86, the saturated web material is maintained in contact with the exposed photographic film on the drum over an angular travel of the drum of approximately 270 degrees. At this point the spent web material is separated from the drum and photographic film and guided over roller 90 to be stored on web takeup spool 88. Web takeup spool 88 is driven by the same drive mechanism as drive roller 86 and developing drum 80 but through an over-running clutch to take into account the variations in diameter of the web material wound on the spool.

The photographic film continues its travel wrapped around developing drum 80 until it is passed around idler roller 92. From idler roller 92 the film is passed around idler roller 94 to drive roller 86 against which it is pressed by means of pressure roller 96 spring biased in the direction of arrow 98. Intermediate the idler rollers 92 and 94 is a film drier 93. In the inventive embodiment this drier takes the form of a closed cylinder containing a thermostatically controlled electrical heating element. Air passed from one end of the drier's cylinder over the heating elements emerges through a slot immediately above the moving developed film and impinges on the film. Such a relatively simple film drier has been found satisfactory for the embodiments constructed to date because of the small amount of liquid material deposited on the film when using the saturated web processing technique.

Emerging from the film processing cassette 68, the processed film 42 is fed into a film storage compartment 104 of the scanner apparatus by means of drive roller 100. The film is passed between drive roller 100 and pressure roller 102 which is spring biased against the drive roller. Drive roller 100 is driven at a rate equal to the rate achieved by the processor and may advantageously be mechanically coupled thereto. However, in those instances where the processing cassettes and the drive roller 100 are not mechanically coupled, the invention provides that the drive roller 100 be driven at a speed equal to the maximum speed expected of the processing cassette through an over-running clutch (not illustrated). The over-running clutch allows the film to slip when the processing cassette is operated at lower than maximum speed or intermittently. The principal need for film storage compartment 104 arises when the film processing cassette 68, either intermittently or continuously, provides film to the scanner at a rate considerably higher than the scanning rate. Under these conditons, film is stored in compartment 104 until it can be scanned.

The film leaving the storage compartment 104 to be scanned is passed over idler roller 110, between idler roller 112 and pressure roller 114 and through slotted film guide 38. Pressure roller 114 is spring biased in the direction of arrow 115. From film guide 38 the film continues around a drive roller 106 to film takeup spool 116. Drive roller 106, against which the film is pressed by spring biased pressure roller 108, provides the driving force for withdrawing film from storage compartment 104. The speed at which film is withdrawn from storage compartment 104 and passed by the shape transducer 20 for scanning, is dependent upon scanning width, sweep time and overlap. As explained above, for a scanning width of 0.001, for no overlap and for scanning rate of 400 cycles per second, film withdrawal is at the rate of 2 feet per minute.

Take up spool 116 is driven by the same drive mechanism as drive roller 106 but through an over-running clutch to allow for variations in the diameter of the film wound on the spool. Except for an electrical interlock (not shown) provided to terminate scanner operation when the supply of processed film in storage compartment 104 is exhausted, the operation of the fiber optic flying spot scanner of FIGURE 7 is from an electrical and mechanical standpoint identical to the operation of those embodiments described above in connection with FIGURES 1 through 4.

FIGURE 8 illustrates in perspective, a modified configuration of the mechanical and optical elements of FIGURE 1. This modified configuration may advantageously be used in reflex scanning. As in FIGURE 1, a drive motor 22 rotates a scanning disc 21 having a radiation distributor 23 embedded therein, or otherwise secured thereto. The motor axis and the ends of the radiation distributor 23 are aligned with a fiber optic shape transducer 20 as explained above in connection with FIGURE 1. The major difference between the configuration of FIGURE 8 and that of FIGURE 1, resides in the location of the radiation detector and in the introduction of a reflective surface behind record medium 42. These variations are advantageously accomplished in the configuration of FIGURE 8 by introducing either a reflector or a reflective coating 120 as the back surface of film guide 38. This reflector, in combination with an optical beam splitter, allows both reflex copying and the use of a substantially smaller radiation detector. As will be evident to those versed in the scanning arts, reflectors are not necessary behind record medium 42 when that medium is opaque.

In FIGURE 8 light from radiation source 27 is focused by lens 28 upon the end 25 of radiation distributor 23 after being passed through beam splitter 122 and being reflected by prism 26. Dotted line 124 indicates a single ray in the bundle thus directed to the radiation distributor. As the drawing shows, the radiation distributor 23 transfers the radiation in this ray bundle to an optical fiber 126 down which it is passed to impinge upon record medium 42. For the moment consider record medium 42 to be semi-transparent negative photographic film. Then, because of the reflector 120 behind record medium 42, the radiation in optical path 124 after modulation by the contrast gradients of record medium 42 will be reflected by reflector 120 and passed back along the same optical fiber 126. This reflected and modulated radiation is indicated by dotted line 128. The modulated radiation is transmitted by radiation distributor 23 and prism 26 and reflected by beam splitter 122 to impinge upon radiation detector 130. The electronic circuitry surrounding radiation detector 130 and the method of generating synchronizing pulses are advantageously identical to those described in connection with FIGURES 1 and 5. Obviously, when record medium is not transparent, reflector 120 is not necessary and the impinging radiation is modulated at the surface of the record medium without passing through it.

FIGURE 9 illustrates another and more versatile configuration of fiber optic flying spot scannner. While the representation of FIGURE 9 is highly schematic, the shape transducer 132 there illustrated is comprised of at least two discrete rows of optical fibers indicated by the reference numerals 134 and 136. Although the two rows of optical fibers 134 and 136 are shown separated to facilitate illustration, the two rows would normally be closely spaced or contiguous. In another configuration, the shape transducer 132 has a multiplicity of fiber rows. In such a configuration the radiation distributors effectively determine which fibers are in a row.

Arranged adjacent the circular end of the circle-to-line shape transducer 132 and coaxially therewith are a scanning disc 138 and its drive motor 140 in an arrangement similar to the arrangement of FIGURE 1. Drive motor 140 is provided with an axial passage extending through its armature shaft. Assembled within that axial passage is a radiation distributor 142. Advantageously radiation distributor 142 terminates flush with or exterior to the end 144 of the armature shaft of drive motor 140. At its opposite extremity radiation distributor 142 is formed so that its end 146 is centro-symmetrically aligned with either row of the fiber rows 134 or 136. As shown in FIGURE 9, end 146 is aligned with fiber row 134 of shape transducer 132. Also assembled and secured to scanning disc 138 is a second radiation distributor 148. Radiation distributor 148 is identical functionally to radiation distributor 23 of FIGURE 1 and has one end arranged axially with the center of rotation of the scanning disc and has its other end centro-symmetrically aligned with fiber row 136.

A lens 150 and a radiation source 152 aligned with the optical axis of radiation distributor 142 opposite its end 143 are arranged to focus a spot of light upon end 143. This radiation, moving in the direction of arrows 154, traverses the radiation distributor 142 and, as scanning disc 138 is rotated, sequentially traverses individual ones of the optical fibers in row 134. As shown in FIGURE 9A, this sequentially scanning radiation is modulated by the information content of record medium 42 and is reflected by reflector 120 into the optical fibers in row 136. For illustration purposes the cones of radiation indicated in FIGURE 9A have been exaggerated. As indicated by arrows 156, this modulated radiation traverses radiation distributor 148, is reflected by prism 158 and is imaged by lens 160 upon radiation detector 162. Radiation detector 162 detects the variations in the radiation incident on itself and provides the output video signal.

While the system of FIGURE 9 is adaptable to reflex scanning as illustrated and described above, another and perhaps more important advantage accrues if radiation source 152 is replaced with a second radiation detector and reflector 120 is replaced with a light source illuminating the entire width of the line end of shape transducer 132. This alternate arrangement is schematically indicated by the light source shown in phantom outline at 131 in FIGURE 9. With this alternate arrangement, it is possible to use radiation detectors having one half the frequency response otherwise necessary or, alternately, to double the rate at which the record medium is moved past the line end of the shape transducer. Where increased speed of transmission is paramount in importance as it frequently is in military applications, scanning apparatus which permits doubling of the scanning rate has proven to be highly desirable.

FIGURE 10 is a schematic in perspective of a printer embodiment of the invention employing a multiple line scan. This inventive embodiment employs a fiber optic shape transducer 170 having a plurality of optically isolated rows of optical fibers. The construction of the multiple path shape transducer is illustrated in FIGURE 11, a section taken at 11 in FIGURE 10. An optical system comprising a prism 172 and an objective lens 174 having a common optical axis are aligned with their common optical axis coincident with the axis of the circular end of the multiple path fiber optic shape transducer 170. The prism 172 is mounted on bearing support 176 for rotation about the common optical axis. Drive motor 178 provides motive power to the prism through gearing 180 to effect its rotation. Angularly aligned with respect to the common optical axis and the axis of rotation of the prism, is a multiple arc glow modulator tube 182. As its name implies, the multiple arc glow modulator tube 182 contains a plurality of electric arcs each individually intensity modulated. As many as 12 such arcs have been enclosed within the envelope of a single tube 182. Each of the multiple arcs is modulated by a separate video signal. With the arcs presently used, each arc is capable of a frequency response in excess of one megacycle and is capable of attaining a peak brightness of approximately 50,000 foot lamberts.

The image of the plurality of modulated arcs within the glow modulator tube 182 is transmitted by the prism 172 and the lens 174 to be imaged upon the plurality of optical fibers at the circular end of the multiple path fiber optic circle-to-line shape transducer 170. It is a special feature of the invention that by skewing the row of arcs within the glow modulator tube 182 with respect to a radial line extending from the common optical axis, crosstalk from fiber to fiber within the shape transducer 170 is materially reduced. The effect of this skewing is a separation of the arc images and is illustrated in FIGURE 12 which shows in schematic form the radiation pattern laid down on the circular end of shape transducer 170. FIGURE 12 is a fragmentary section taken at 12 in FIGURE 10.

In FIGURE 12 the transmitting optical fibers not being irradiated by the individual arcs of glow modulator tube 182 are illustrated as a plurality of circles 184, whereas, those fibers being irradiated by the image of the individual arcs are illustrated as solid dots 186. As pointed out above, the skewed arrangement of arcs results in the physical separation of adjacent arc images. The separation of the arcs' images reduces cross-talk.

To provide uniform continuous scanning from line group to line group as required at the line end of the shape transducer 170, the images of the plurality of arcs of glow modulator tube 182 are placed in circular motion at the required scanning velocity. Advantageously, this circular scanning is accomplished by rotation of prism 172. This prism has the property of rotating the object field, as viewed by the objective, at an angular velocity twice that of the prism itself. Desirably, prism 172 is the type known as a roofless Brashear-Hastings prism. This form of prism, in addition to its ability to rotate the image at twice its own rotation rate, has a higher optical acceptance angle than other prisms that might be used for this purpose.

As the image of the modulated arcs is swept around the circular end of the circle-to-line shape transducer 170, the image of the modulated arcs is caused to cyclically sweep across the linear end of shape transducer 170 as illustrated in FIGURE 11. Although for illustration purposes photographic film 188 and the film guide 38 have been moved from their normal position proximate to the linear end of the shape transducer, it can be seen that as the photographic film 188 moves past the linear end of the shape transducer in the direction of arrow 190 it will be exposed by the cyclically sweeping images of the modulated arc light sources. After exposure, the film can be processed in any desired manner.

As indicated by the dotted outline of lamp 192 in FIGURE 10 it is possible to reverse the operation described above and convert the printer of FIGURE 10 to a scanner. By merely utilizing a source such as lamp 192 and by replacing the multiple arc glow moduator tube 182 with a multiple arrangement of radiation detectors, it is possible to use the embodiment of FIGURE 10 as a high speed scanner.

It will be understood by those skilled in the art that changes may be made in the construction and arrangement of the parts of the disclosed illustrative embodiments without departing from the real spirit and purpose of the invention and that it is our intention to cover by the claims any modified forms of structure or use of equivalents which may reasonably be included within the scope of the invention.

What is claimed as the invention is:

1. Apparatus for transducing variations in a radiation characteristic of photographic film to varying electrical signals, comprising, in combination, a strip of carrier web material, chemical agents applied to the carrier web material for carrying out the photographic development of the photographic film, developing drum means for receiving the photographic film and the carrier web material, means for bringing the carrier web material and the chemical agents into sandwiching engagement with the photographic film on the developing drum, storage means for storage spent storage means for storing spent carrier web material, motive power means for rotating the developing drum and the web storage means, storage means for storing processed photographic film, a fiber optic circle-to-line transducer, means for withdrawing the photographic film from the storage means and for transporting the film past the line end of the shape transducer and in close proximity thereto, rotatable radiation conducting distributor means arranged to have its one end positioned at its axis of rotation and to have its other end centro-symmetrically alined with the circular end of the shape transducer, a radiation source positioned to direct radiation upon the axial end of the distributor means, means for rotating the distributor means, and radiation detector means positioned to receive radiation transmitted through the distributor means, the shape transducer, and the photographic film, the radiation detector means being adapted to generate electrical signals in response to variations in the radiation characteristics of the photographic film.

2. Apparatus for transducing variations in a radiation characteristic of photographic film to varying electrical signals, comprising, in combination, a strip of carrier web material, chemical agents applied to the carrier web material for carrying out the photographic development of the photographic film, developing drum means for receiving the photographic film and the carrier web material, means for bringing the carrier web material and the chemical agents into sandwiching engagement with the photographic film on the developing drum, motive power means for rotating the developing drum, a fiber optic circle-to-line transducer, means for transporting the processed photographic film past the line end of the shape transducer and in close proximity thereto, rotatable radiation conducting distributor means arranged to have its one end positioned at its axis of rotation and to have its other end centro-symmetrically alined with the circular end of the shape transducer, a radiation source positioned to direct radiation upon the axial end of the distributor means, means for rotating the distributor means, and radiation detector means positioned to receive radiation transmitted through the distributor means, the shape transducer, and the photographic film, the radiation detector means being adapted to generate electrical signals in response to variations in the radiation characteristics of the photographic film.

3. Apparatus for transducing variations in a radiation characteristic of a record medium to varying electrical signals, comprising, in combination, a fiber optic circle-to-line shape transducer, means for transporting the record medium past the line end of the shape transducer and in close proximity thereto, scanning disc means adapted for rotation about the axis of the circular end of the shape transducer, radiation distributing fiber optic means secured to the scanning disc means and traversing a path thereon extending radially from the axis of rotation to a point alined with the optical fibers at the circle end of the shape transducer, motor means for rotating the scanning disc means, a radiation source positioned to direct radiation upon the axial end of the rotating radiation distributing fiber optic means to thereby effect a cyclical line scan of the record medium with radiation from the radiation source, reflector means positioned parallel and adjacent to the record medium on the side opposite the shape transducer to reflect modulated radiation passed through the record medium back through said record medium, radiation beam splitting means interposed between the radiation source and the radiation distributing fiber optic means, and radiation detector means positioned to receive modulated radiation reflected thereon by the beam splitter means and adapted to generate electrical signals varying in accordance with variations in the radiation characteristics of the record medium.

4. Apparatus for transducing variations in a radiation characteristic of a record medium to varying electrical signals, comprising, in combination, a fiber optic circle-to-line shape transducer, means for transporting the record medium past the line end of the shape transducer and in close proximity thereto, scanning disc means adapted for rotation about the axis of the circular end of the shape transducer, radiation distributing fiber optic means secured to the scanning disc means and traversing a path thereon extending radially from the axis of rotation to a point alined with the optical fibers at the circle end of the shape transducer, motor means for rotating the scanning disc means, a radiation source positioned to direct radiation upon the axial end of the rotating radiation distributing fiber optic means to thereby effect a cyclical line scan of the record medium with radiation from the radiation source, radiation beam splitting means interposed between the radiation source and the radiation distributing fiber optic means, and radiation detector means positioned to receive modulated radiation reflected thereon by the beam splitter means and adapted to generate electrical signals varying in accordance with variations in the radiation characteristics of the record medium.

5. Flying spot scanning apparatus for transducing variations in a radiation characteristic of a record medium to varying electrical signals, comprising, in combination, a multiple path fiber optic circle-to-line shape transducer, means for transporting the record medium past the line end of the multiple path shape transducer and in close proximity thereto, reflector means positioned parallel and adjacent to the record medium on the side opposite the shape transducer, motor means having its axis of rotation coincident with the axis of the circular end of the shape transducer, the motor's armature shaft having an axial passage therethrough, support means mounted to the armature shaft of the motor for rotation therewith, a first radiation distributor means secured to the support means and having one end alined with a first row of fibers at the circular end of the multiple path shape transducer, the first radiation distributor means having its other end extending through the axial passage in the motor's armature shaft whereby rotation of the support means effected by the motor means results in a cyclically recurring scan of the fibers in the first row by the first radiation distributor means, a second radiation distributor means secured to the support means and traversing a path thereon extending radially from the axis of rotation to a point alined with a second row of optical fibers at the circle end of the multiple path shape transducer whereby rotation of the support means effected by the motor means results in a cyclically recurring scan of the fibers in the second row by the second radiation distributor means, a radiation source positioned to direct radiation upon the axial end of the first radiation distributor means, and radiation detector means positioned to receive radiation emitted from the second radiation distributor means and adapted to generate electrical signals which vary in response to variations in the radiation characteristics of the record medium.

6. Flying spot scanning apparatus for transducing variations in a radiation characteristic of a record medium to varying electrical signals, comprising, in combination, a multiple path fiber optic circle-to-line shape transducer, means for transporting the record medium past the line end of the multiple path shape transducer and in close proximity thereto, reflector means positioned parallel and adjacent to the record medium on the side opposite the shape transducer, motor means having its axis of rotation coincident with the axis of the circular end of the shape transducer, the motor's armature shaft having an axial passage therethrough, support means mounted to the armature shaft of the motor for rotation therewith, a first radiation distributor means secured to the support means and having one end alined with a first row of fibers at the circular end of the multiple path shape transducer, the first radiation distributor means having its other end extending through the axial passage in the motor's armature shaft whereby rotation of the support means effected by the motor means results in a cyclically recurring scan of the fibers in the first row by the first radiation distributor means, a second radiation distributor means secured to the support means and traversing a path thereon extending radially from the axis of rotation to a point alined with a second row of optical fibers at the circle end of the multiple path shape transducer whereby rotation of the support means effected by the motor means results in a cyclically recurring scan of the fibers in the second row by the second radiation distributor means, a radiation source positioned to direct radiation upon the axial end of the second radiation distributor means, and radiation detector means positioned to receive radiation emitted from the first radiation distributor means and adapted to generate electrical signals which vary in response to variations in the radiation characteristics of the record medium.

7. Flying spot scanning apparatus for transducing variations in a radiation characteristic of a record medium to varying electrical signals, comprising, in combination, a multiple path fiber optic circle-to-line shape transducer, means for transporting the record medium past the line end of the multiple path shape transducer and in close proximity thereto, motor means having its axis of rotation coincident with the axis of the circular end of the shape transducer, the motor's armature shaft having an axial passage therethrough, support means mounted to the armature shaft of the motor for rotation therewith, a first radiation distributor means secured to the support means and having one end alined with a first row of fibers at the circular end of the multiple path shape transducer, the first radiation distributor means having its other end extending through the axial passage in the motor's armature shaft whereby rotation of the support means effected by the motor means results in a cyclically recurring scan of the fibers in the first row by the first radiation distributor means, a second radiation distributor means secured to the support means and traversing a path thereon extending radially from the axis of rotation to a point alined with a second row of optical fibers at the circle end of the multiple path shape transducer whereby rotation of the support means effected by the motor means results in a cyclically recurring scan of the fibers in the second row by the second radiation distributor means, a radiation source positioned to direct radiation upon the axial end of the first radiation distributor means, and radiation detector means positioned to receive radiation emitted from the second radiation distributor means and adapted to generate electrical signals which vary in response to variations in the radiation characteristics of the record medium.

8. Flying spot scanning apparatus for transducing variations in a radiation characteristic of a record medium to varying electrical signals, comprising, in combination, a multiple path fiber optic circle-to-line shape transducer, means for transporting the record medium past the line end of the multiple path shape transducer and in close proximity thereto, a radiation source positioned to direct radiation upon the record medium, motor means having its axis of rotation coincident with the axis of the circular end of the shape transducer, the motor's armature shaft having an axial passage therethrough, support means mounted to the armature shaft of the motor for rotation therewith, a first radiation distributor means secured to the support means and having one end alined with a first row of fibers at the circular end of the multiple path shape transducer, the first radiation distributor means having its other end extending through the axial passage in the motor's armature shaft whereby rotation of the support means effected by the motor means results in a cyclically recurring scan of the fibers in the first row by the first radiation distributor means, a second radiation distributor means secured to the support means and traversing a path thereon extending radially from the axis of rotation to a point alined with a second row of optical fibers at the circle end of the multiple path shape transducer whereby rotation of the support means effected by the motor means results in a cyclically recurring scan of the fibers in the second row by the second radiation distributor means, first radiation detector means positioned to receive radiation emitted from the first radiation distributor means and adapted to generate electrical signals in response to the radiation incident thereon, second radiation detector means positioned to receive radiation emitted from the second radiation distributor means and adapted to generate electrical signals in response to the radiation incident thereon.

9. A flying spot recorder for transducing variations in electrical signals to variable intensity radiation recorded on a radiation sensitive record medium comprising, in combination, a plurality of sources of variable electrical signals, a multiple path fiber optic circle-to-line shape transducer, means for guiding the radiation sensitive record medium past the line end of the shape transducer in close proximity thereto, optical means for focusing an image upon the optical fibers at the circular end of the circle-to-line shape transducer, a plurality of radiation sources each connected to a source of variable electrical signals and having a variable intensity radiation output proportional to the variable electrical signal, the plurality of radiation sources being positioned to be simultaneously imaged by the optical means on the circular end of the shape transducer, means for rotating the optical means at a predetermined rate to effect a cyclical rotation of the images of the plurality of radiation sources about the circular end of the shape transducer, and means for transporting the photographic film past the line end of shape transducer at a rate proportional to the optical means whereby the image of each of the plurality of varying intensity radiation sources cyclically scanning across the record medium is recorded thereon.

10. A flying spot recorder in accordance with claim 9 wherein the optical means comprises a roofless Brashear-Hastings prism.

11. A flying spot scanner for transducing variations in a radiation characteristic of a record medium to varying electrical signals, comprising, in combination, a multiple path fiber optic circle-to-line shape transducer, means for guiding the record medium past the line end of the shape transducer in close proximity thereto, a radiation source positioned to direct radiation upon that area of the record medium alined with the line end of the shape transducer, a plurality of radiation detector means positioned facing the circular end of the shape transducer, each of the plurality of radiation detectors being adapted to generate electrical signals proportional to variations in radiation incident thereon, rotatable optical means located intermediate the plurality of radiation detectors and the circular end of the shape transducer for focusing an image of each of the plurality of radiation detectors upon the optical fibers at the circular end, means for rotating the optical means at a predetermined rate to effect a cyclical rotation of the images of the plurality of radiation detectors on the circular end of the shape transducer, and means for transporting the record medium past the line end of the shape transducer at a rate proportional to the rate of rotation of the optical means whereby the radiation from the source modulated by its passage through the record medium and transmitted by the shape transducer is cyclically scanned and transduced by the plurality of radiation detectors to varying electrical signals.

12. A flying spot scanner in accordance with claim 11 wherein the optical means comprises a roofless Brashear-Hastings prism.

References Cited

UNITED STATES PATENTS

| | | | |
|---|---|---|---|
| 3,167,612 | 1/1965 | Strickholm | 178—6 |
| 3,240,106 | 3/1966 | Hicks | 178—6 |
| 3,249,692 | 5/1966 | Clay et al. | 178—6 |
| 3,255,357 | 6/1966 | Kapany et al. | 178—6 |

ROBERT L. GRIFFIN, *Primary Examiner.*

R. L. RICHARDSON, *Assistant Examiner.*